Nov. 16, 1954     H. FIELD, JR     2,694,405
AUTOMATIC SHUTOFF VALVE FOR HYDRAULIC TRANSMISSION SYSTEMS
Filed Jan. 24, 1949

INVENTOR.
HOWARD FIELD, JR.
BY HIS ATTORNEYS.
HARRIS, KIECH, FOSTER & HARRIS

United States Patent Office 2,694,405
Patented Nov. 16, 1954

2,694,405

AUTOMATIC SHUTOFF VALVE FOR HYDRAULIC TRANSMISSION SYSTEMS

Howard Field, Jr., Los Angeles, Calif.

Application January 24, 1949, Serial No. 72,342

15 Claims. (Cl. 137—102)

This invention relates to improvements in hydraulic valves and more particularly to an automatic shut-off valve adapted to be used in hydraulic systems of the type which include a source of fluid under pressure, a pressure line extending from the fluid source to a device to be actuated and a return line extending from the device to the source of fluid.

Hydraulic systems of this type are commonly utilized in aircraft and my invention will be described as embodied in an aircraft system although it is obviously not intended that my invention be limited to this particular use since it could conceivably be installed in a wide variety of hydraulic systems.

The valve which is constructed in accordance with my invention is installed in a hydraulic system in such a manner that both the pressure flow and the return flow pass through it. It is designed primarily to prevent the leakage of hydraulic fluid through either the pressure or return lines, should one of the lines be broken or should a severe leak develop therein.

In operation, the initial action of the valve permits a predetermined amount of fluid to pass under pressure through the pressure line and into the device to be actuated. The actuation of the device by the predetermined amount of fluid will cause fluid to be forced out of the device and back through the valve. It is this return flow that causes the opening of the valve to permit the passage of pressure fluid through the valve to the device to be actuated.

If the pressure line were leaking or broken, the predetermined amount of fluid delivered by the initial action of the valve would never reach the device to be actuated, the device would not function and there would be no return flow from it. Therefore, the valve would remain closed and no fluid under pressure could pass through the valve into the broken line. Thus, only the comparatively small amount of fluid delivered by the initial action of the valve would be lost.

When the return line is broken or leaking, the valve delivers a predetermined amount of fluid to the device to be actuated and the device begins to function, thus forcing fluid into the broken return line. However, since the line is broken, none of this fluid reaches the valve and the valve remains closed, preventing the flow of pressure fluid into the device to be actuated and the consequent loss of fluid forced out of the device and into the broken return line. Valves of this type, constructed in accordance with U. S. Patent 2,428,150 issued to me on September 30, 1947, are designed so that the loss of fluid from the system is negligible.

However, it has been discovered that situations can occur where the very efficiency of the valve in preventing pressure fluid flow to a device to be actuated, should a line be broken, will prevent flow of fluid to a device to be actuated even though no lines be leaking or severed.

For instance, let us assume that an airplane is flying with its landing gear retracted. The pilot moves his landing gear selector valve to extend the gear and it starts down in the normal manner. Obviously, there is a return flow from the "gear-up" end of the actuating cylinder which causes the valve to open and permits pressure fluid to pass into the cylinder until the extension of the gear is completed. This return flow of fluid from the cylinder will occur whenever the gear is moving downward for any cause whatsoever.

Occasionally, however, the gear may be moved downwardly by the air stream at a faster rate than the hydraulic system can supply hydraulic fluid to the "gear-down" end of the hydraulic cylinder. As long as the gear moves downward, fluid is forced from the "gear-up" end of the cylinder and the valve is kept open, permitting pressure fluid to flow into the "gear-down" side of the cylinder. The free fall of the gear will also cause a reduction in pressure in the "gear-down" side of the cylinder due to the fact that the flow of pressure fluid cannot keep pace with the movement of the gear. Ultimately, the air stream will be unable to carry the gear any further and the movement of the gear will stop. This cessation of movement will cut off the flow of fluid from the "gear-up" end of the cylinder through the return line and into the valve. The valve will close and the flow of pressure fluid into the "gear-down" end of the cylinder will be cut off. The cutting off of the return flow thus causes the valve to react as if a line in the system were broken. Therefore, the pilot is unable to extend the gear into the full down position and a very dangerous condition results.

In circumstances such as this, the very efficiency of the automatic shut-off valve in cutting off the flow of pressure fluid is the factor which prevents the further actuation of the landing gear. Since it is definitely not desirable to eliminate the shut-off valve from the system, it is necessary to provide a valve which will have means embodied in it designed to prevent such occurrences as that described above.

My invention provides a valve designed to prevent the loss of fluid through leaking or broken lines which will not cut off the flow of the pressure fluid to a stalled device to be actuated immediately upon cessation of the flow of the return fluid from the actuated device. On the contrary, a certain amount of fluid under pressure will be passed through the valve and into the actuated device to permit the device to resume its movement after it has stalled.

It is, therefore, a primary object of my invention to provide an automatic shut-off valve which embodies means adapted to permit the passage of fluid under pressure to a stalled device from which no return flow is passing into the valve.

Another object of my invention is the provision of an automatic cut-off valve which is so constructed that it will not ordinarily permit pressure fluid to pass through it to a device to be actuated unless a return flow comes from the device, and which will, when the movement of the device has been initiated and subsequently stalled due to inadequate pressure flow, permit the pressure fluid to pass to the device despite the lack of a return flow therefrom.

A further object of my invention is the provision of an automatic shut-off valve which will permit pressure fluid to be passed to a stalled device but which will shut off the flow of the fluid if a line between the device and the valve should fail.

Another object of my invention is the provision of an automatic shut-off valve which is essentially simple in construction, light in weight, easy to manufacture and moderate in cost.

Other objects and advantages of my invention will appear from the following specification and the accompanying drawing, which is for the purpose of illustration only and in which.

Figure 1:
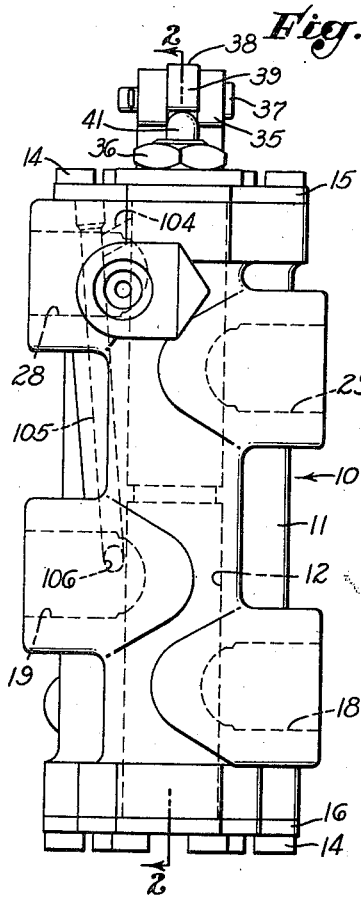
Fig. 1 is a vertical elevational view of a preferred embodiment of my invention.
Figure 2:
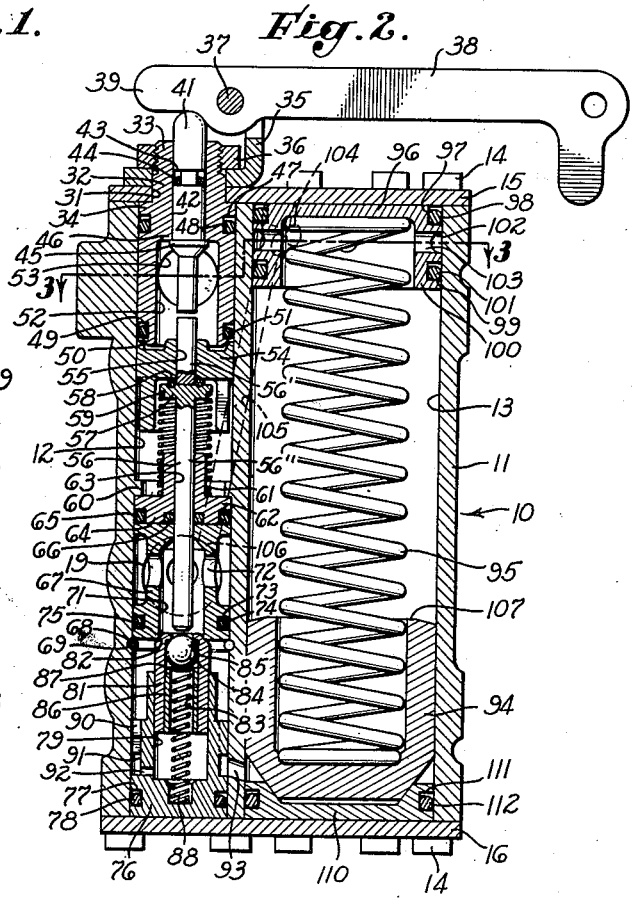
Fig. 2 is a vertical sectional view taken on broken line 2—2 of Fig. 1.

Referring to the drawing, I show a valve 10 which comprises a valve body 11 having formed in the interior thereof a cylindrical valve chamber 12 and a cylindrical displacement chamber 13. The cylindrical displacement chamber 13 is of considerably larger diameter than cylindrical valve chamber 12. Secured to the top of the valve body 11, as by means of screws 14 or similar fastenings, is a cover plate 15 and secured to the bottom of the valve body in a similar manner is a cover plate 16.

Figure 4:
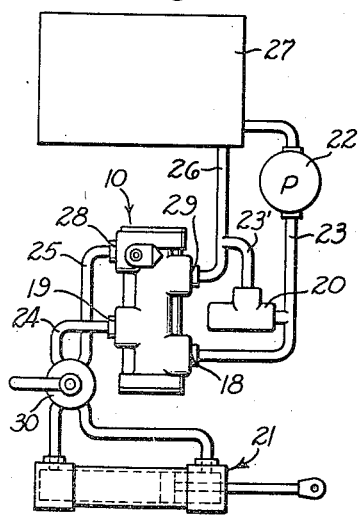
Fig. 4 is a diagrammatic view of the manner in which the valve is incorporated in a typical hydraulic system.
Figure 3:
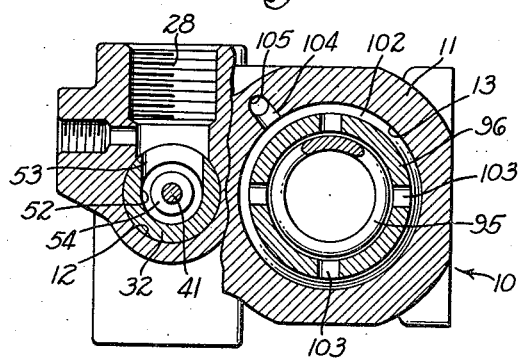
Fig. 3 is a horizontal sectional view of the valve taken on broken line 3—3 of Fig. 2.

An inlet port 18, adapted to permit fluid under pressure to be introduced into the valve chamber 12, communicates with the chamber 12. An outlet port 19 is located on the other side of the valve body 11 and permits fluid under pressure to pass out of the valve to a device to be actuated, such as a hydraulic cylinder 21, as shown in Fig. 4. Also shown in Fig. 4 is a pump 22 which supplies fluid under pressure to the valve 10 through the medium of a line 23 and thence through a line 24 to the hydraulic cylinder 21. The fluid is returned from the cylinder 21 through a line 25 to the valve 10. From the valve 10 it passes through a line 26 into a reservoir 27 for storage and recirculation. A pressure relief valve 20 is inserted in the line 23 between the valve 10 and the pump 22 and is adapted to by-pass pressure fluid through a line 23' into the return line 26 when the valve 10 or a selector valve 30 is closed.

A return inlet port 28 is formed in the valve 10 and is adapted to receive the return fluid brought from the cylinder 21 through the line 25. This fluid is passed through the valve chamber 12 and out into the line 26 through a return outlet port 29. A circular opening 31 is formed in the cover plate 15 on the top of the valve body 11 and a cylindrical sleeve 32 which lies in the upper end of the bore of valve chamber 12 has a threaded portion 33 projecting through the opening 31. The cylindrical sleeve 32 has a shoulder 34 formed thereon which seats on the underside of the cover plate 15. Mounted upon the threaded portion 33 of the sleeve 32 is a bracket 35 which is held upon the sleeve 32 by means of a nut 36 which is threaded upon the threaded portion 33 of the sleeve 32. Pivotally supported in the bracket 35, as by means of a pin 37, is a lever 38 which has an end 39 in contact with a pin 41 which projects upward from valve chamber 12 through a circular bore 42 formed through the threaded portion 33 of the cylindrical sleeve 32. The purpose and function of the lever 38 will be described below. An annular groove 43 formed in the periphery of the pin 41 receives an O-ring 44 which effectively prevents the leakage of fluid through the bore 42 past the pin 41.

A circular flange 45 formed upon the periphery of the pin 41 where it emerges from the bore 42 seats on a shoulder 46 formed in the interior of the sleeve 32 and effectually prevents the dislodgement of the pin through the bore 42. The sleeve 32 has an annular groove 47 formed in its upper periphery which receives a sealing ring 48. A similar lower groove 49 receives a sealing ring 51. The sealing rings 48 and 51 contact the walls of the valve chamber 12 and prevent fluid from flowing between the exterior surface of the sleeve and the chamber wall. The sleeve 32 is counterbored to provide an enlarged passage 52. The wall of the sleeve 32 has an opening 53 formed therein which registers with the return inlet port 28 and permits the return fluid to flow at low pressure through the passage 52.

Adapted to seat upon a seat 50 formed on the lower end of the sleeve 32 is a piston valve 54 which has a vertical bore 55 formed in it which receives the upper end of a push rod 56. The upper end of the push rod 56 extends into the passage 52 in the sleeve 32 and is adapted to be contacted by the lower end of the pin 41 in a manner to be described below. The rod 56 may be made in two parts 56' and 56" to permit the self-alignment of the upper and lower portions thereof. An integral flange 57 is formed on the push rod 56 where it leaves the bore 55 and an O-ring 58 is interposed between the upper surface of the flange 57 and the underside of the valve 54. The valve 54 effectually prevents the passage of the return fluid into the return outlet port 29 as long as it is seated on the lower end of the sleeve 32. However, the flow of return fluid at low pressure through the return inlet port 28 is sufficient to unseat the valve 54 and permit the passage of return fluid to the return fluid outlet port 29.

A circumferential cut 59 is formed on the annular flange 57 which receives the upper end of a compression spring 61 which biases the flange 57 against the underside of valve 54 and, in turn, tends to retain valve 54 in seating contact on the valve seat 50 on the lower end of sleeve 32. The other end of the spring 61 is seated upon a spring seat 62 which has an internal bore 63 through which passes the push rod 56. Upward movement of the spring seat 62 is prevented by a circular flange 60 formed on the wall of the valve chamber 12. Seated between an annular, depending flange 64 on the underside of the spring seat 62 and the wall of the valve chamber 12 is an O-ring 65 which prevents the passage of fluid between the chamber wall and the edge of the spring seat 62. On the inside of the flange and positioned about the periphery of the push rod 56 is another O-ring 66 which prevents the passage of fluid between the push rod 56 and the walls of the internal bore 63 in spring seat 62.

A sleeve member 67 is held against the underside of the spring seat 62 through the intermediary of a snap ring 68 which seats in a groove 69 cut in the wall of the valve chamber 12. A fluid chamber 71 formed in the interior of the sleeve 67 communicates with the pressure outlet port 19 by means of orifices 72 formed in the wall of the sleeve member 67. An O-ring 73 seated in a circumferential groove 74 in the periphery of the sleeve 67 contacts the valve chamber wall and prevents the passage of fluid between the sleeve 67 and the valve chamber wall. The extreme lower end of the push rod 56 depends into the fluid chamber 71 and a valve seat 75 is formed in the lower end of the sleeve 67.

Positioned in the lower end of the valve chamber 12 is a fluid metering means which is constituted in part by a valve guide 76 which has a circumferential groove 77 formed in its basal region adapted to receive an O-ring 78 which seals the valve guide 76 with respect to the valve chamber 12. A longitudinal chamber 79 is formed within the valve guide 76 and has a poppet valve 81 slidably positioned for reciprocal, longitudinal movement therein. A valve face 82 is formed on the upper end of the poppet valve 81, which is adapted to be biased into contact with the valve seat 75 formed on the lower end of the sleeve 67. A circular bore 83 is formed in the interior of the poppet valve 81 which constitutes the outlet thereof and is adapted to be sealed through the medium of a ball valve 84 which is housed therein and which seats on a valve seat 85 formed at the upper end of the bore 83. A retainer sleeve 86 pressed into the lower end of the poppet valve 81 prevents the ball valve 84 from being dislodged from the bore 83. A notch 87 is formed on the upper edge of the retainer sleeve 86 to prevent the ball valve 84 from sealing thereupon. A light compression spring 88 is seated on the base of the chamber 79 and has its upper end engaged with the ball valve 84, thus normally retaining the valve face 82 on the upper end of the poppet valve 81 in contact with the valve seat 75 formed on the lower end of the sleeve 67. The pressure inlet port 18 is thus sealed off from the pressure outlet port 19 by means of the seating of the valve face 82 of the poppet valve 81 upon the seat 75. Therefore, should fluid under pressure flow into the valve chamber 12 through pressure inlet port 18, it cannot flow out of pressure outlet port 19 until the poppet valve 81 is unseated from the seat 75. The passage between the inlet and outlet ports 18 and 19, respectively, constitutes a pressure passage which also serves as a pressure fluid metering passage to meter a limited quantity of fluid to the stalled hydraulic cylinder 21 under certain conditions to be described below.

A plurality of spaced, longitudinal passages 90 are formed in the periphery of the valve guide 76 and communicate with an annular groove 91 formed below the passages on the periphery of the valve guide 76. A transverse metering port 92 is formed in the wall of the valve guide 76 and establishes communication between the groove 91 and the chamber 79 in the interior of the valve guide 76. The passages 90, the annular groove 91 and the metering port 92 communicate with the chamber 79 and constitute a valve control metering passage which controls the movement of the valve 81. The metering port 92 constitutes the inlet to the valve 81 while the bore 83 constitutes the outlet therefrom.

A port 93 cut in the wall of the displacement chamber 13 establishes communication between the pressure inlet port 18 and the displacement chamber 13. A piston 94 is housed within the displacement chamber 13 and is urged towards the lower end of the chamber by means of a compression spring 95 which is seated in a spring seat 96. The piston 94 and the displacement chamber 13 constitute displacement means adapted to inject a measured amount of fluid into the device to be actuated. The spring seat 96 has a reduced top portion 97 adapted to receive an O-ring 98 and a lower circumferential groove 99 adapted to receive an O-ring 101. The underside of the spring seat 96 constitutes a seat 100 for the piston 94 which has a metering valve face 107 formed on its upper end. The O-rings prevent the passage of fluid between the periphery of the spring seat 96 and the wall of the displacement chamber 13. An annular groove 102 is formed in the interior surface of the spring seat 96 and a number of orifices 103 are formed therein which communicate with the interior of the spring seat 96 and permit fluid to flow from the interior of the displacement chamber 13 into a passage 104 formed in the wall of the chamber. A longitudinal conduit 105 conducts fluid from the passage 104 down to a discharge opening 106 which opens into the pressure outlet port 19. A piston stop 110 is located at the bottom of the displacement chamber 13 and has an annular groove 111 formed therein adapted to receive an O-ring 112 which prevents the leakage of fluid between the piston stop 110 and the wall of the displacement chamber 13.

When it is desired to actuate the hydraulic cylinder 21, the selector valve 30, mounted across and controlling the flow of fluid through the lines 24 and 25, is opened. Since the piston valve 81 is seated upon the valve seat 75 the fluid under pressure cannot flow into the pressure outlet port 19 so it passes through the annular groove 91 in the valve guide 76 and thence through the port 93 into the displacement chamber 13 below the piston 94. The displacement chamber 13 is already full of fluid and the entrance of the pressure fluid through the port 93 causes upward movement of the piston 94 against the action of the compression spring 95. The fluid contained in the displacement chamber 13 above the piston 94 is expelled, by the upward movement of the piston 94, through the orifices 103 in the spring seat 96 and into the passage 104 in the wall of the chamber 13. The fluid is then conducted downwardly through the conduit 105 and discharged from the opening 106 into the pressure outlet port 19. It is carried from the pressure outlet port 19 through the line 24 into the rightward end of the cylinder 21. As the piston in the cylinder 21 starts to move to the left, as seen in Fig. 4, return fluid will be expelled from the left-hand end of the cylinder into the line 25 and thence into the return inlet port 28 of the valve 10. This low pressure return fluid will flow through the opening 53 into the passage 52 of the sleeve 32 and will act on the valve 54, unseating it from the seat 50 and permitting the return fluid to flow from the return outlet port 29, through the line 26 into the reservoir 27.

The downward movement of the valve 54 causes downward movement of the push rod 56. The extreme lower end of the downwardly moving push rod 56 will unseat the ball valve 84 from its seat upon valve seat 85, the movement of the ball valve 84 against the retainer sleeve 86 will carry the poppet valve 81 downward and pressure fluid will be permitted to flow into the pressure outlet port 19 from the pressure inlet port 18 past the poppet valve 81. As long as pressure fluid continues to flow to the cylinder 21 and return fluid continues to flow therefrom, the valve 10 will remain open. The above flow description applies only to a system in which all the lines are unbroken and is characteristic of the normal operation of the valve.

Should the line 24 from the valve 10 to the cylinder 21 spring a serious leak or be ruptured before fluid under pressure is fed into the valve 30, when the pressure fluid is fed to valve 10 the fluid contained in the displacement chamber 13 above the piston 94 will be discharged therefrom into the broken line 24 and through the break or rupture and thus will never reach the cylinder 21 to start its left-hand movement. Since the cylinder 21 is not actuated there will be no return fluid flow and the valve 81 will not open. Thus, the release of pressure fluid into the broken line 24 will be prevented and the only fluid lost through the rupture will be that displaced by the piston 94 during its upward movement, which is a relatively small volume.

If the return flow line 25 between the cylinder 21 and the valve 10 is ruptured prior to the passage of pressure fluid to the valve 10 and pressure fluid is subsequently fed to the valve 10, the fluid in displacement chamber 13 will be delivered to the cylinder 21, the piston of which will start to move and discharge return fluid into the broken line 25. Since the line 25 is broken the return fluid will pass therefrom through the break or rupture and will not reach the valve 10 and the valve 10 will not open and the only fluid lost through the rupture will be that displaced by the piston 94 during its upward movement, which is a relatively small volume.

It is conceivable that either of the lines 24 or 25 may be ruptured after the movement of the cylinder 21 has been initiated and the valve 10 opened by the return fluid flowing therefrom. The rupture of the line 24 will cut off the flow of pressure fluid to the cylinder 21, the cylinder will stop moving and the flow of return fluid into the valve 10 will be cut off. The cessation of the return fluid flow will permit the push rod 56 to be carried upward by the force of the spring 61. Thus, the end of the push rod 56 will be moved out of contact with the ball valve 84. When this happens the spring 88 will drive the ball valve 84 onto its seat 85 thus closing the interior of the valve guide 76 to the entry of fluid except through the transverse metering port 92 and the longitudinal passages 90 in the valve guide 76. When the ball valve 84 was off its seat 85 the fluid pressures inside and outside of valve guide 76 were the same. Now that the ball valve 84 has reseated, the pressure acting on the ball valve inside the valve guide 76 is less than the pressure acting thereon outside by just the amount created by the spring 88. As fluid meters into the interior of the chamber 79 through the longitudinal passages 90 and the transverse port 92, the pressure differential tends to become smaller and the poppet valve 81 is shifted upwardly toward its seat 75 by the spring 88. The movement of the valve 81 by the spring 88 once again increases the volume of the chamber 79 causing a pressure differential to be created between the exterior and the interior of the chamber 79 and the movement of the piston valve 81 ceases because the forces thereupon are in temporary balance. As long as the poppet valve 81 is not seated upon its seat 75, fluid under pressure will continue to be metered from the pressure inlet port 18 out through the primary metering passage to the pressure outlet port 19. Therefore, if line 24 is broken after the valve 10 is opened, a small amount of fluid will be forced out of the line before the valve piston 81 seats on its seat 75. If the return line 25 is broken, a small amount of return fluid will be pumped through the broken line 25 before the seating of the valve poppet 81 upon its seat 75 finally cuts off the flow of pressure fluid and stops the movement of the piston in the cylinder 21.

Therefore, the assembly constituted by the valve guide 76 and the poppet valve 81 provides a metering means designed to prevent the instantaneous cutting off of the flow of pressure fluid through the valve 10 and into the cylinder 21. Although a greater amount of fluid may be discharged through a broken line because of this metering provision, the assembly avoids the possibility that the flow of pressure fluid may be shut off by the valve 10 before a stalled device has been fully actuated.

Let us assume that the cylinder 21 constitutes the main actuating cylinder of an aircraft landing gear, and that the diagrammatic hydraulic system shown in Fig. 4 is the control system for that cylinder. The opening of the valve 30 by the pilot will permit fluid under pressure to flow through the line 24 since fluid under pressure will be discharged from the displacement chamber 13 of the valve 10, initiating the movement of the piston in the cylinder 21 and causing a return flow through the line 25 into the valve 10 which will open the valve and permit fluid under pressure to flow into the cylinder 21.

The landing gear (not shown) has dropped into the air stream and the force of the air stream drives the gear downward so fast that the pressure of the fluid passing into the cylinder 21 on its "down-gear" side drops sharply. Thus, there is insufficient pressure in the "down-gear" side of the cylinder to cause it to move further. When the air stream can carry the gear downward no further, the movement of the piston in the cylinder 21 ceases because there is insufficient pressure in the cylinder 21 to move the gear and return fluid no longer passes into the valve 10 to hold it open. The movement of the piston in the cylinder 21 ceases because there is insufficient pressure in the "down-gear" side of the cylinder to cause the cylinder piston to move when the air stream becomes ineffective. If the hydraulic control system were equipped with a conventional automatic shut-off valve, the passage of pressure fluid to the cylinder of the partially extended gear would be cut off and a very dangerous condition would result.

However, since the hydraulic system is provided with an automatic shut-off valve 10 constructed in accordance with my invention, the cessation of movement of the piston in the cylinder 21 and the consequent cutting off the return flow into the valve 10 does not instantaneously shut off the flow of pressure fluid through the valve 10. The metering means which delays the closing off of the flow of pressure fluid through the valve 10 will permit fluid under pressure to be delivered to the "down-gear" side of the cylinder 21. This supplementary pressure flow will initiate the movement of the piston in the cylinder 21 once again, thus causing a return flow to the valve 10 which will hold the valve 10 open until the landing gear is fully extended. The amount of pressure fluid passed by the valve 10 after the cessation of the return flow into the valve can be controlled by the force of the spring 88 which governs the duration of the travel of the poppet valve 81 toward its seat 75. Of course, the variation of the diameter of the port 92 is the ultimate criterion of the time during which pressure fluid will be permitted to flow through the valve 10 after return flow thereto has ceased.

By my invention I provide an automatic shut-off valve which will effectively shut off the flow of fluid into a broken line but which will, nevertheless, permit a predetermined amount of fluid to be passed through the valve after the supply of return fluid which keeps the valve open has ceased. Thus, the possibility that a stalled device may be deprived of precious fluid by the instantaneous shutting off of the valve is avoided, and inconvenient or dangerous situations due to the stalling of the device can be averted.

Should it be necessary to test the valve 10 or to bleed the hydraulic lines, the valve can be opened for the passage of pressure fluid therethrough by depressing the end 39 of the lever 38. The end 39 of the lever 38 will drive the pin 41 down into the valve chamber 12 causing the lower end of the pin 41 to drive the push rod 56 down and displacing the poppet valve 81 from its seat 75. This will permit pressure fluid to flow through the valve.

Although I have shown and described a preferred embodiment of my invention, it will be appreciated that certain parts and elements thereof may be replaced by other parts and elements having the same function and method of operation, and therefore I do not intend to be limited to the specific construction shown, but desire to be afforded the full scope of the following claims.

I claim as my invention:

1. In an automatic shut-off valve having a valve body with pressure inlet and outlet ports with a pressure passage between them and having return inlet and outlet ports with a return passage between them, the combination of: displacement means in said body having its opposite ends communicating respectively with said pressure inlet and outlet ports; pressure valve means positioned in said pressure passage for preventing communication between said pressure inlet and outlet ports; return valve means positioned in said return passage for preventing communication between said return inlet and outlet ports; longitudinally shiftable means interposed between said pressure valve means and said return valve means for transmitting opening movement of said return valve means to said pressure valve means to cause opening movement of said pressure valve means; and pressure fluid metering means in said pressure passage communicating with the inlet side of said pressure valve means to retard the closing of said pressure valve means by creating a pressure differential between said inlet side and the other side of said pressure valve means.

2. In an automatic shut-off valve having a valve body with pressure inlet and outlet ports with a pressure passage between them and having return inlet and outlet ports with a return passage between them, the combination of: displacement means in said body having its opposite ends communicating respectively with said pressure inlet and outlet ports; pressure valve means positioned in said pressure passage for preventing communication between said pressure inlet and outlet ports; return valve means positioned in said return passage for preventing communication between said return inlet and outlet ports; means for transmitting opening movement of said return valve means to said pressure valve means to cause opening movement of said pressure valve means; and pressure fluid metering means constituted by restricted passage means interposed between said pressure passage and the inlet side of said pressure valve means for creating a pressure differential between said inlet side of said pressure valve means and the other side thereof to retard the closing of said pressure valve means.

3. In an automatic shut-off valve having a valve body with pressure inlet and outlet ports with a pressure passage between them and having return inlet and outlet ports with a return passage between them, the combination of: displacement means in said body having its opposite ends communicating respectively with said pressure inlet and outlet ports; pressure valve means positioned in said pressure passage for preventing communication between said pressure inlet and outlet ports; return valve means positioned in said return passage for preventing communication between said return inlet and outlet ports; longitudinally shiftable means interposed between said pressure valve means and said return valve means for transmitting opening movement of said return valve means to said pressure valve means to cause opening movement of said pressure valve means; and pressure fluid metering means constituted by restricted passage means interposed between said pressure passage and inlet side of said pressure valve means for creating a pressure differential between said inlet side of said pressure valve means and the other side thereof to retard the closing of said pressure valve means.

4. In an automatic shut-off valve having a valve body with pressure inlet and outlet ports with a pressure passage between them and having return inlet and outlet ports with a return passage between them, the combination of: displacement means in said body having its opposite ends communicating respectively with said pressure inlet and outlet ports; pressure valve means positioned in said pressure passage for preventing communication between said pressure inlet and outlet ports; return valve means positioned in said return passage for preventing communication between said return inlet and outlet ports; longitudinally shiftable rod means interposed between said return valve means and said pressure valve means for transmitting opening movement of said return valve means to said pressure valve means to cause opening movement of said pressure valve means; and pressure fluid metering means communicating with the inlet side of said pressure valve means to retard the closing of said pressure valve means by creating a pressure differential between the inlet side and the other side of said pressure valve means.

5. In an automatic shut-off valve having a valve body with pressure inlet and outlet ports with a pressure passage between them and having return inlet and outlet ports with a return passage between them, the combination of: displacement means in said body having its opposite ends communicating respectively with said pressure inlet and outlet ports; pressure valve means positioned in said pressure passage for preventing communication between said pressure inlet and outlet ports; return valve means positioned in said return passage for preventing communication between said return inlet and outlet ports; means for transmitting opening movement of said return valve means to said pressure valve means to cause opening movement of said pressure valve means; means for urging said pressure valve means into normally closed position; and pressure fluid metering means communicating with the inlet side of said pressure valve means to retard the closing of said pressure valve means by creating a pressure differential between said inlet side and the other side of said pressure valve means.

6. In an automatic shut-off valve having a valve body with pressure inlet and outlet ports with a pressure passage between them and having return inlet and outlet ports with a return passage between them, the combination of: displacement means in said body having its opposite ends communicating respectively with said pressure inlet and outlet ports; pressure valve means positioned in said pressure passage for preventing communication between said pressure inlet and outlet ports; return valve means positioned in said return passage for preventing communication between said return inlet and outlet ports; means for transmitting opening movement of said return valve means to said pressure valve means to cause opening movement of said pressure valve means; and pressure valve control metering means in said pressure passage communicating with the inlet side of said pressure valve means to retard the closing of said pressure valve means by creating a pressure differential between said inlet side and the other side of said pressure valve means.

7. In an automatic shut-off valve having a valve body with pressure inlet and outlet ports with a pressure passage between them and having return inlet and outlet ports with a return passage between them, the combination of: displacement means formed in said body having its opposite ends communicating respectively with said pressure inlet and outlet ports; pressure valve means positioned in said pressure passage for preventing communication between said pressure inlet and outlet ports; return valve means positioned in said return passage for preventing communication between said return inlet and outlet ports, the opening of said return valve means causing the opening movement of said pressure valve means; and pressure valve control metering means communicating with said pressure inlet port and the inlet side of said pressure valve means to retard the closing of said pressure valve means by creating a pressure differential between said inlet side and the other side of said pressure valve means.

8. In an automatic shut-off valve having a valve body with pressure inlet and outlet ports with a pressure passage between them and having return inlet and outlet ports with a return passage between them, the combination of: displacement means formed in said body having its opposite ends communicating respectively with said pressure inlet and outlet ports; poppet valve means positioned in said pressure passage for preventing communication between said pressure inlet and outlet ports; piston valve means positioned in said return passage for preventing communication between said return inlet and outlet ports, opening movement of said piston valve means causing it to contact said poppet valve means to open said poppet valve means; and poppet valve control metering means communicating with the inlet side of said poppet valve means to retard the closing of said poppet valve means by creating a pressure differential between said inlet side and the other side of said poppet valve means.

9. In an automatic shut-off valve having a valve body with pressure inlet and outlet ports with a pressure passage between them and having return inlet and outlet ports with a return passage between them, the combination of: displacement means formed in said body having its opposite ends communicating respectively with said pressure inlet and outlet ports; pressure valve means positioned in said pressure passage for preventing communication between said pressure inlet and outlet ports; return valve means positioned in said return passage for preventing communication between said return inlet and outlet ports, said return valve means having actuating means connected thereto for contacting said pressure valve means as said return valve means opens to cause the opening of said pressure valve means; and pressure valve control metering means communicating with the inlet side of said pressure valve means to retard the closing of said pressure valve means by creating a pressure differential between said inlet side and the other side of said pressure valve means.

10. In an automatic shut-off valve having a valve body with pressure inlet and outlet ports with a pressure passage between them and having return inlet and outlet ports with a return passage between them, the combination of: displacement means formed in said body having its opposite ends communicating respectively with said pressure inlet and outlet ports; pressure valve means positioned in said pressure passage for preventing communication between said pressure inlet and outlet ports; return valve means positioned in said return passage for preventing communication between said return inlet and outlet ports, said return valve means having actuating means connected thereto for contacting said pressure valve means as said return valve means opens to cause the opening of said pressure valve means; and pressure valve control metering means communicating with said pressure inlet port and the inlet side of said pressure valve means to retard the closing of said pressure valve means after said pressure valve means has been moved by said actuating means by creating a pressure differential between said inlet side and the other side of said pressure valve means.

11. In an automatic shut-off valve having a valve body with pressure inlet and outlet ports with a pressure passage between them and having return inlet and outlet ports with a return passage between them, the combination of: displacement means formed in said body having its opposite ends communicating respectively with said pressure inlet and outlet ports; poppet valve means positioned in said pressure passage for preventing communication between said pressure inlet and outlet ports; piston valve means positioned in said return passage for preventing communication between said return inlet and outlet ports, said piston valve means being adapted to contact said poppet valve means to cause the movement of said poppet valve means; and poppet valve control metering means in said pressure passage communicating with said pressure inlet port and the inlet side of said poppet valve means to retard the seating of said poppet valve means by creating a pressure differential between said inlet side and the other side of said poppet valve means.

12. In an automatic shut-off valve, the combination of: a valve body provided with pressure inlet and outlet ports and a pressure passage therebetween; pressure responsive valve means movable in said valve body between open and closed positions for opening and closing said pressure passage; means for opening said pressure responsive valve means; and means including a pressure fluid metering passage communicating between said pressure inlet port and one side of said pressure responsive valve means for applying to said pressure responsive valve means a fluid pressure differential in a direction to retard movement of said pressure responsive valve means toward said closed position.

13. An automatic shut-off valve as defined in claim 12 including: a displacement chamber in said valve body; movable piston means in said displacement chamber; a passage providing fluid communication between said pressure fluid metering passage and said displacement chamber on one side of said piston means; and another passage providing fluid communication between said displacement chamber on the opposite side of said piston means and said pressure outlet port.

14. An automatic shut-off valve as defined in claim 13 wherein said valve body is provided with a return inlet port and a return outlet port with a return passage therebetween, said means for opening said pressure responsive valve means including means in said return passage and responsive to flow therethrough from said return inlet port to said return outlet port.

15. An automatic shut-off valve as defined in claim 12 wherein said valve body is provided with a return inlet port and a return outlet port with a return passage therebetween, said means for opening said pressure responsive valve means including means in said return passage and responsive to flow therethrough from said return inlet port to said return outlet port.

References Cited in the file of this patent

UNITED STATES PATENTS

| Number | Name | Date |
|---|---|---|
| 2,428,150 | Field | Sept. 30, 1947 |
| 2,478,211 | Sprague et al. | Aug. 9, 1949 |
| 2,493,906 | Wishart | Jan. 10, 1950 |